United States Patent [19]

Terry

[11] Patent Number: 5,006,404

[45] Date of Patent: Apr. 9, 1991

[54] REPLACEABLE INK PAD

[75] Inventor: Betty A. Terry, Weston, Conn.

[73] Assignee: Pitney Bowes, Inc., Stamford, Conn.

[21] Appl. No.: 591,531

[22] Filed: Oct. 1, 1990

[51] Int. Cl.$^5$ .............................................. B32B 3/26
[52] U.S. Cl. ............................. 428/316.6; 428/317.1; 428/317.7; 428/321.1; 428/321.3
[58] Field of Search .............. 428/316.6, 317.1, 317.7, 428/321.1, 321.3

[56] References Cited

U.S. PATENT DOCUMENTS

| | | | |
|---|---|---|---|
| 4,306,498 | 12/1981 | Fujimura | 428/316.6 |
| 4,336,767 | 6/1982 | Wada | 428/321.3 |
| 4,358,505 | 11/1982 | Narumiya et al. | 428/321.3 |

Primary Examiner—William J. Van Balen
Attorney, Agent, or Firm—Peter Vrahotes; Melvin J. Scolnick; David E. Pitchenik

[57] ABSTRACT

This invention relates to a replaceable ink pad that is capable of supplying ink in excess of 5,000 printing cycles. The ink pad is made of a first layer of polyethylene foam that is attached to a bottom layer of felted melamine foam by a porous polyamide adhesive. The first layer has a pore size of 10-20 microns and the bottom layer has a pore size of 140-180 microns. A tray can be provided to securely hold the pad.

7 Claims, 1 Drawing Sheet

REPLACEABLE INK PAD

BACKGROUND OF THE INVENTION

In the printing industry, there are many instances where a replaceable ink pad is beneficial as opposed to an ink pad to which ink is periodically supplied mechanically. Many printers have a sump that stores ink and a pump that will drive the ink from the sump through appropriate passages to a inking pad that will transfer ink to a print head or dye. The drawback of an ink supplying system is that it requires space and maintenance and has a measure of high cost associated with it.

Another type of ink pad is one which is initially charged with ink and replaced after the ink has become exhausted. Replaceable ink pads have been used previously in printers; however, such prior ink pads were deficient in terms of the number of prints that could be produced using such replaceable ink pads. Prior ink pads could produce up to 3,000 printing cycles, but this is not sufficient for most printing requirements. Clearly, it would be advantageous to provide a replaceable ink pad that has characteristics so that at least 5,000 print cycles can be achieved before replacement is required.

SUMMARY OF THE INVENTION

A replaceable ink pad that is capable of providing ink in a printing machine in excess of five thousand printing cycles has been conceived. The pad is made of a top layer of polyethylene foam that is adhered to a bottom layer of felted melamine foam by a porous polyamide adhesive. The first layer has a pore size of 10–20μ and the second layer has a pore size of 140–180μ. As used in the printing mechanism of a mailing machine, the top layer had a thickness of 0.020 inches and the bottom layer a thickness of 0.145 inches.

BRIEF DESCRIPTION OF THE DRAWING

The single FIGURE of the drawing is a cross sectional view of a replaceable ink pad made in accordance with the instant invention.

DETAILED DESCRIPTION OF THE PREFERRED EMBODIMENT(S)

Figure 1:
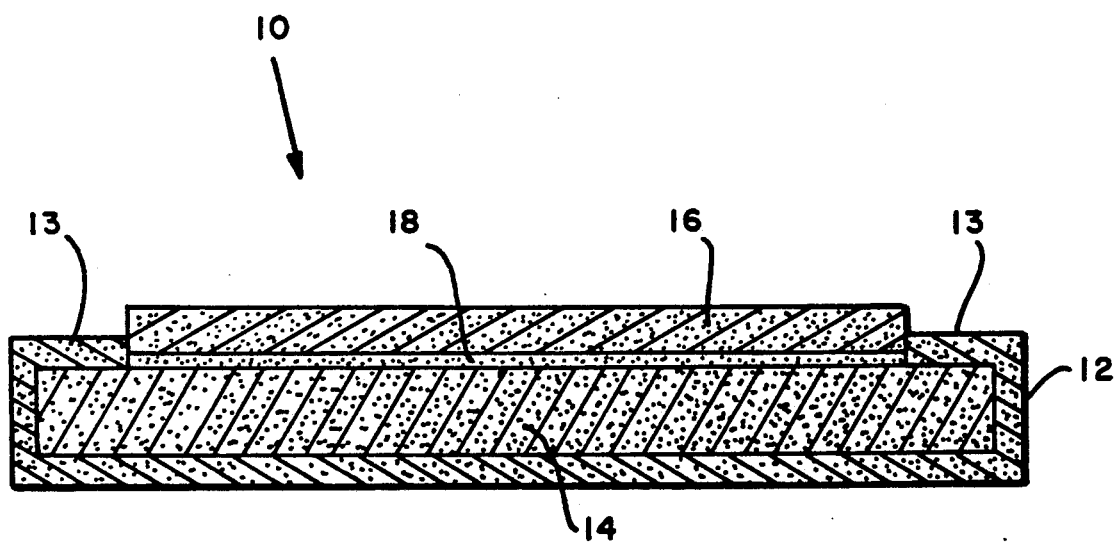

With reference to the drawing, a replaceable ink pad is shown generally at 10 and is supported by a tray 12 that will be part of a printing mechanism. Then tray 12 includes a lip 13 for securing the ink pad. The rest of the printing mechanism will not be described as it does not form part of the instant invention. By replaceable ink pad is meant a pad that will contain ink and release the ink slowly as contact is made with a printing dye. To be replaceable, the ink pad must be relatively inexpensive, and conveniently replaceable in its support.

The pad 10 includes a bottom layer 14 that serves as an ink reservoir and is made of porous melamine foam that has a pore size of 140–180μ. The melamine foam was felted by compressing with heat of 500° F. to 550° F. for a period of approximately five minutes and subjected to pressure to provide the necessary resiliency to recover from printing impacts with a printing dye and to assure the required amount of ink is released with each printing cycle. The pressure was created by reducing the thickness of the pad by approximately ⅓. The density before compression was 0.011 grams per centimeter and after heat and pressure it was densified to approximately 0.03 grams per cc. Even after compression, the bottom layer had a density substantially lower then prior materials which proved beneficial for the storage of a increased amount of inks.

A top layer 16 is attached to the bottom layer 14 by a fusible adhesive 18. A web adhesive that allows the ink to flow and is compatible with ink. The adhesive 18 is an adhesive 18 that has been found to be particularly useful is porous polyamide 0.008 inches thick, density of 20 grams/m$^2$ and a melting temperature of 112°–120° C. The top layer 16 is foam material with relatively small pores such as polyethylene with a pore size of 10–20μ that serves to dispense ink to a print dye by which it is contacted. The pad 10 will have ink 20 supplied thereto by a conventional manner.

In the ink pad of the instant invention, the bottom layer had a thickness of 0.145 inches and the top layer 16 had a thickness of 0.020 inches. The adhesive is preferably a web adhesive that is heat activated. The heat activation can be accomplished by either having the pad in an oven or in a press at 310° to 315° C. for three minutes.

The pad 18 was tested in a rig to simulate the printing mechanism of a mailing machine and was operated it in a number of tests. It was found that the pad 10 would yield 5,000–11,000 print cycles when supplied with solution fluorescent ink. After a number of cycles, in excess of 5000, the fluorescence of the imprint was measured and was found to be greater then 7 phosphor ascent meter units (PMU) consistently. With such results, the pad 10 can readily be used as a replaceable inking pad for a device such as a mailing machine.

What is claimed is:

1. A replaceable ink pad comprising:
    a first layer of foam having a pore size of 10–20μ,
    a second layer of foam, said second layer having one major surface addressing a major surface of said first layer and being made of a foam having a pore size 140–180 microns,
    and a fusible web adhesive intermediate and in contact with said first layer major surface and said second layer major surface.

2. The replaceable ink pad of claim 1 including a tray for supporting said first and second layers.

3. The replaceable ink pad of claim 1 wherein said first layer is a polyethylene foam.

4. The replaceable ink pad of claim 1 wherein said second layer is a melamine foam.

5. The replaceable ink pad of claim 4 wherein said adhesive is polyamide.

6. The replaceable ink pad of claim 5 including a tray for securing said first and second layers.

7. The replaceable ink pad of claim 5 wherein said second layer is felted after having been compressed at a temperature of 500° F. to 550° F. for approximately five minutes.

* * * * *